(12) United States Patent
Hammett

(10) Patent No.: US 12,722,056 B2
(45) Date of Patent: Sep. 1, 2026

(54) LAMINATED PICKLE BALL PADDLE

(71) Applicant: Troy Devon Hammett, Sebring, FL (US)

(72) Inventor: Troy Devon Hammett, Sebring, FL (US)

( * ) Notice: Subject to any disclaimer, the term of this patent is extended or adjusted under 35 U.S.C. 154(b) by 405 days.

(21) Appl. No.: 18/495,379

(22) Filed: Oct. 26, 2023

(65) Prior Publication Data

US 2024/0382812 A1 Nov. 21, 2024

Related U.S. Application Data

(60) Provisional application No. 63/502,482, filed on May 16, 2023.

(51) Int. Cl.
*A63B 59/42* (2015.01)
*B32B 5/28* (2006.01)

(52) U.S. Cl.
CPC ................ *A63B 59/42* (2015.10); *B32B 5/28* (2013.01); *A63B 2209/023* (2013.01); *A63B 2209/10* (2013.01)

(58) Field of Classification Search
CPC .............. A63B 59/42; A63B 2209/023; A63B 2209/10; B32B 5/28; B32B 2262/101;
(Continued)

(56) References Cited

U.S. PATENT DOCUMENTS

D980,930 S 3/2023 Kirkconnell
2015/0226281 A1 † 8/2015 Wakabayashi
(Continued)

FOREIGN PATENT DOCUMENTS

CN 113082656 A * 7/2021 ............. A63B 59/42
CN 119015678 A * 11/2024 ............. A63B 59/42
(Continued)

OTHER PUBLICATIONS

Translation of CN 113082656 A. (Year: 2021).*
(Continued)

*Primary Examiner* — Jeffrey S Vanderveen
(74) *Attorney, Agent, or Firm* — Brooks Kushman P.C.

(57) ABSTRACT

A laminated pickle ball paddle and method of making a compression molding a flat panel, therefore. The flat paddle made of a multi-layer laminate stack having, two layers of woven fiber material which are preimpregnated with a polymer resin, a sound deadening layer sandwiched between adhesive layers, and a central core layer made of a structural balsa material, a polypropylene honey comb material and or cork. On the other side or the central core another a sound deadening layer is sandwiched between adhesive layers, and there is another two layers of woven fiber material which are preimpregnated with a polymer resin, The stacked layers can be hot press for a period of time between platens to cure the preimpregnated polymer then partially cooled and removed from the press. Alternatively, the two layers of woven fiber material which are preimpregnated with a polymer resin can be procured together before the stacked layers can be hot press for a period of time between platens.

16 Claims, 5 Drawing Sheets

(58) Field of Classification Search
CPC ....... B32B 5/024; B32B 2250/40; B32B 3/12; B32B 5/12; B32B 9/047; B32B 25/10; B32B 29/02; B32B 2260/023; B32B 2260/046; B32B 2262/106; B32B 5/26; B32B 7/12
See application file for complete search history.

(56) References Cited

U.S. PATENT DOCUMENTS

| | | | | |
|---|---|---|---|---|
| 2016/0193793 | A1 * | 7/2016 | Filippini | B29D 99/0014 264/138 |
| 2017/0136325 | A1 * | 5/2017 | Fox | A63B 59/42 |
| 2021/0252356 | A1 * | 8/2021 | Thurman | A63B 59/42 |
| 2023/0048280 | A1 † | 2/2023 | Drexler | |

FOREIGN PATENT DOCUMENTS

| | | | | |
|---|---|---|---|---|
| WO | WO2018169851 | † | 9/2018 | |
| WO | WO-2022217045 A1 | * | 10/2022 | A63B 59/42 |

OTHER PUBLICATIONS

Translation of CN 119015678 A. (Year: 2024).*

Toray Composite Materials America, Inc. the data sheet for the 3900 Prepreg System, revision Jul. 30, 2020.

ACM15 Corkcore made by Amorim Cork Composites SA. The ACM15 Material Data Sheet dated 2017.

PP Plascore Honycomb; Plasticore Inc. with a thickness of about 9 mm with a density rating of 3.5 to 8. The PP Polypropylene Honeycomb data sheet data 2021.

66214 peel ply layer; Precision Fabrics Group of Greensborough North Carolina style 66214 the data sheet of which, downloaded Jun. 20, 2023.

HYTONE LS-034; Hygienic Corporation of Akron Ohio. the LS034 data sheet, downloaded Jun. 20, 2023.

* cited by examiner
† cited by third party

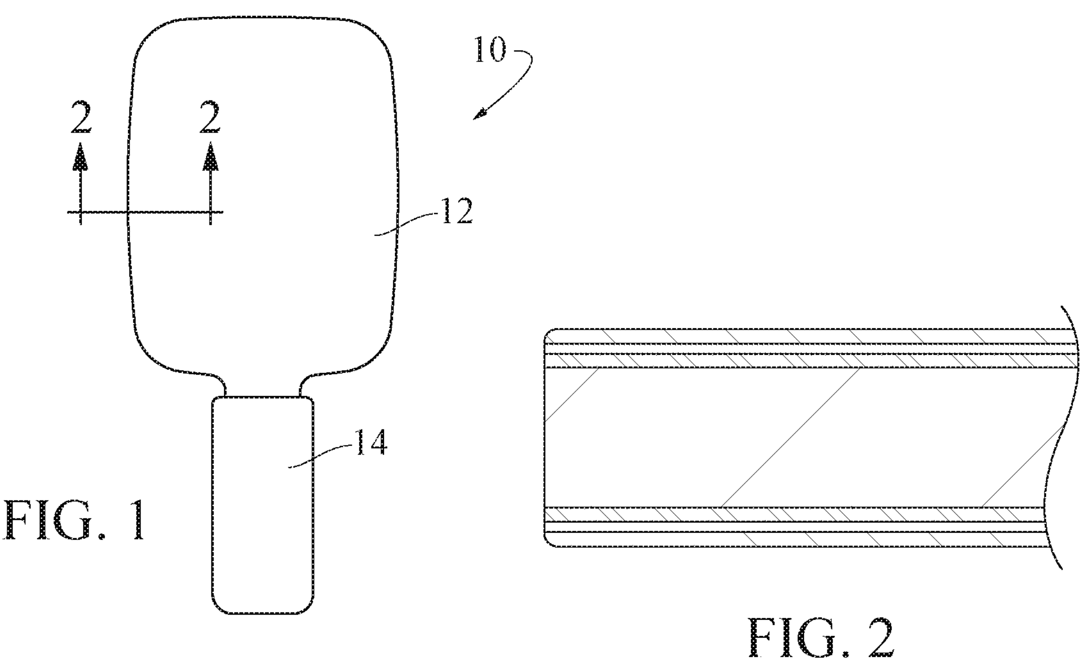
FIG. 1
FIG. 2
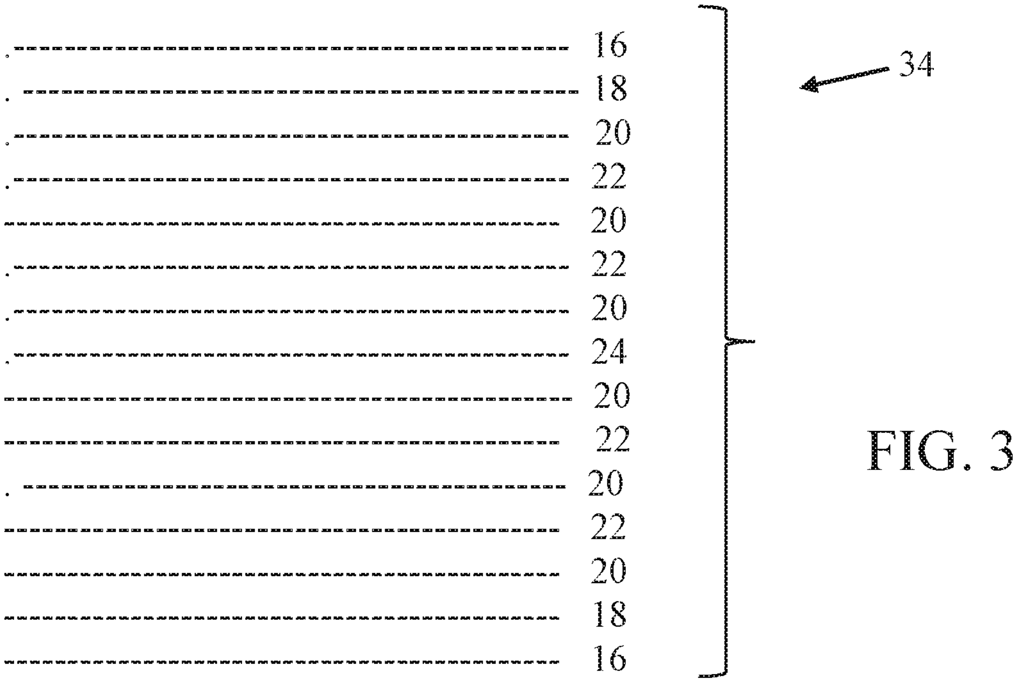
FIG. 3

16
18
20
44
20
42
20
44
20
18
16
40

16
18
20
44
20
52
20
44
20
18
16
50

62
16
18
20
64
20
42
20
64
20
18
16
62
60

62
16
18
20
72
20
52
20
73
20
18
16
62
70

62
16
18
20
44
20
52
20
44
20
18
16
62
80

62
16
18
20
44
20
52
20
44
20
18
16
62
90

62
16
18
20
78
20
102
20
78
20
18
16
62
100

62
16
18
20
73
20
52
20
73
20
18
16
62
110

62
16
18
20
44
20
52
20
44
20
18
16
62
120

LAMINATED PICKLE BALL PADDLE

CROSS-REFERENCE TO RELATED APPLICATION

This application claims the benefit of U.S. provisional application Ser. No. 63/502,482 filed May 16, 2023, the disclosure of which is hereby incorporated in its entirety by reference herein.

TECHNICAL FIELD

This invention relates to pickle ball paddles and methods of making paddles by laminating.

BACKGROUND

Pickle ball is a rapidly growing sport played on a court which is similar to a tennis court but much smaller. The small court size enables the courts to be installed in many new areas frequently close to residential housing and outdoor social areas. There has been increasing complaints about noise cause by the paddle striking the ball. The average dBA rating is around 82 or higher with hertz above 1200. Further there has been a desire to create as much spin as possible by changing the surface roughness of the face. This is closely regulated by the governing board USAPA.

SUMMARY

An object of the present invention is to reduce the noise caused by ball strike and maximize playability or touch while creating spin. The present paddle is formed using a laminating process. The paddle looks like a large ping pong paddle having a flat bladelike structure attached to a handle sized to be held in one hand. The paddle has a central core and opposed structural outside layers. Intermediate the structural layers and the core are thin sound deadening layers connected by layers of adhesive film. The laminate layers are hot pressed between platens for a period of time to cure the adhesive.

Compared to standard paddles the new paddle sound dampened ball strike noise is <80 dBA and below 1000 Hertz. The time dwell of the sound is also much shorter than standard paddles. The sound is changed in frequency and duration and modified from >1200 Hertz to <1000 Hertz. Resultant sound changes from a pop to a thud, and the Hertz drops a full octave.

BRIEF DESCRIPTION OF THE DRAWINGS

FIG. 1 is a plan view of a pickle ball paddle;

FIG. 2 is a cross sectional view taken along section 2-2 in FIG. 1;

FIG. 3 is a laminate stack identifying the various layers of an embodiment of the pickle ball paddle;

DETAILED DESCRIPTION

Figures 4, 5, 6:
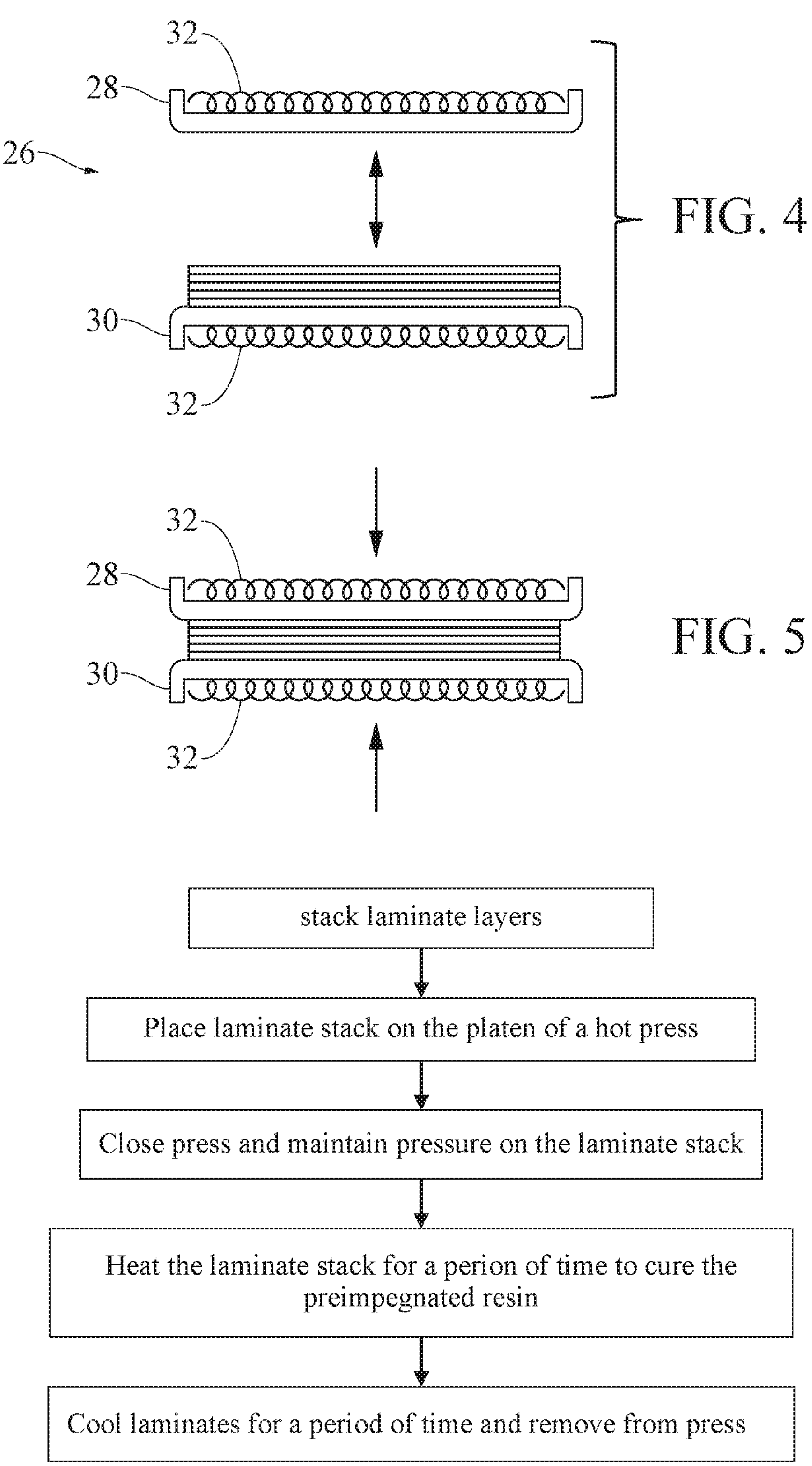
FIG. 4 is hot press machine in the open position with the laminate stack located on the lower platen.
FIG. 5 is hot press machine in the closed position with the laminate stack located on the lower platen.
FIG. 6 illustrates an embodiment of a method used to make pickle ball paddles.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates an embodiment of a pickle ball paddle 10 having a flat blade portion 12, with a front and back side, and a handle 14 sized to be used with a single hand. FIG. 2 is a cross sectional side view taken along section line 2-2 in FIG. 1. This paddle embodiment has a flat panel portion 34 made of fifteen layers identified in FIG. 3. The top layer 16 is a carbon fiber unidirectional which is preimpregnated with a polymer resin. The second layer 18 is also a carbon fiber unidirectional which is preimpregnated with a polymer resin. a carbon fiber unidirectional which is preimpregnated with a polymer resin. An example of a suitable unidirectional carbon fiber which is preimpregnated with a polymer resin is available from Toray Composite Materials America, Inc. the data sheet for the 3900 Prepreg System, revision 7.30.2020, is incorporated by reference herein.

The weave of the second layer 18 has its unidirectional cloth oriented about 90° to that of the top layer 16 to achieve good bending strength an all directions when cured. The cured combined top and second layers 16 and 18 have a combined thickness of about 1 mm. The next layer is an adhesive film 20 about 0.010 inches thick which attaches the second layer 18 to a sound deadening layer 22. In this embodiment sound deadening layer 22 is a cork or cork composite material for example ACM15 or NL20 Cork core made by Amorim Cork Composites SA. The ACM15 and NL20 Material Data Sheet dated November 2017 is incorporated by reference herein. The cork and cork composites will have various densities. Cork is a natural sound damping option that takes sound and converts it to heat thereby absorbing the sound. This means it can be used as a monolithic core layer or in combination with other cores. By manipulating the densities, we can adjust the damping and feel aspect of the racquet. Another adhesive film 20 attaches another sound deadening layer 22 which is attached to a central core 24. The central core in this embodiment is a polypropylene honeycomb structure such as the PP Plascore Honycomb made by Plasticore Inc. with a thickness of about 9 mm with a density rating of 3.5 to 8. The PP Polypropylene Honeycomb data sheet data 2021 is incorporated herein.

The back side of the panel has the same structure, and adhesive film 20, a deadening layer 22, another adhesive film 20 and a deadening layer 22, followed by a second layer 18 and a top layer. When cured the panel 12 thickness is about 14 mm thick.

The method of curing the laminate panel is illustrated the FIG. 6 block diagram. In order to cure the laminate assembly, the stacked layers are place in a hot press 26 between the platens 28 and 30. Preferably the platens are flat and made of steel and are each provided with a heat source 32. With the platens closed about the laminate stack a compressive force of 5 to 100 PSI is applied. The platen temperature is held at about 250 degrees fahrenheit for about 2 hours to cause the preimpregnated resin in the carbon fiber layers 16 and 18 to cure. Upon at least partial cooling to room temperature the cured laminate composite is removed from the press 26.

The cured laminate composite stack is cut to the final shape of the paddle 12. In some embodiments a thin protective peripheral trim may be install about the blade peripheral edge.

Figures 7, 8, 9:
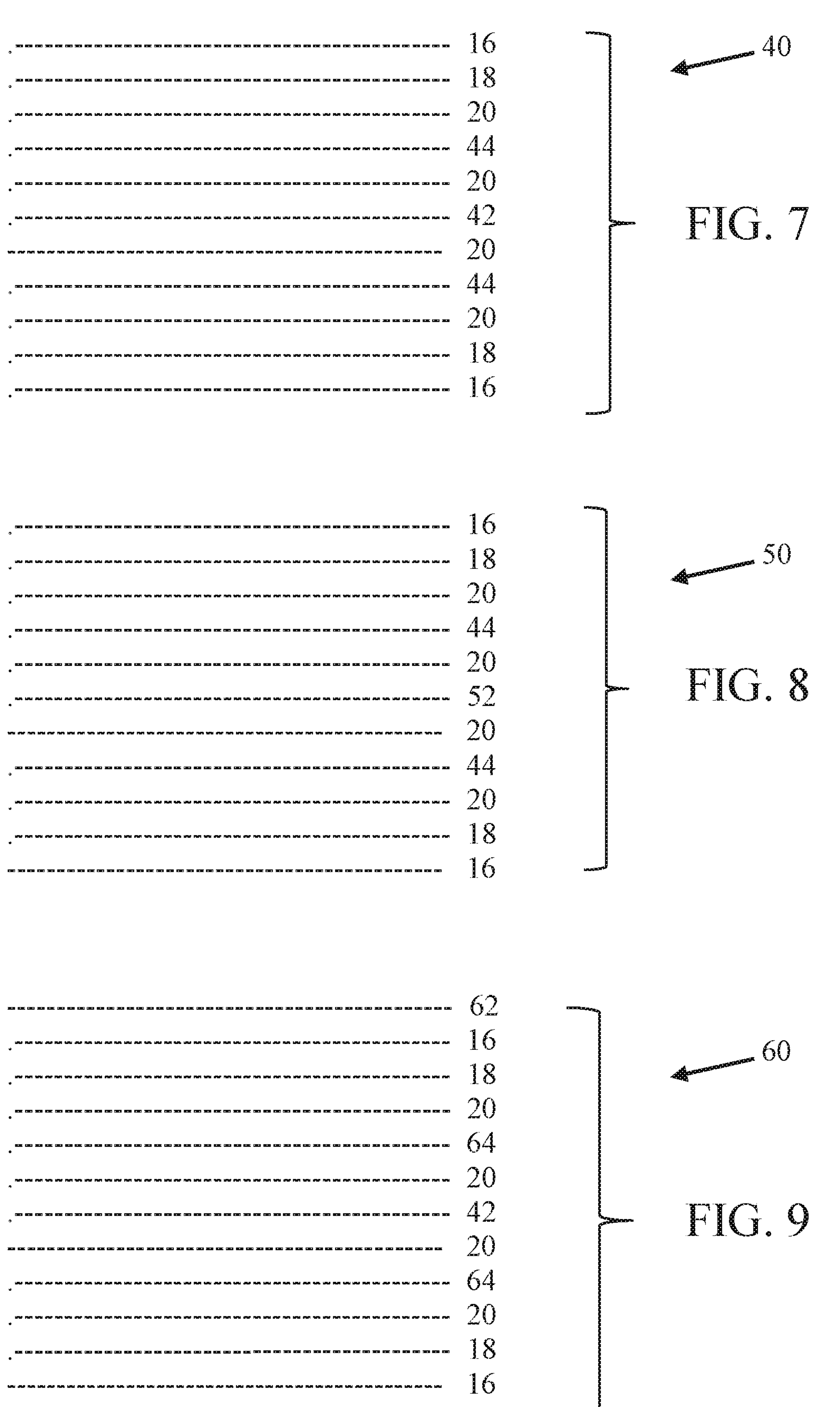
FIG. 7 is a laminate stack identifying the various layers of a second embodiment of the pickle ball paddle.
FIG. 8 is a laminate stack identifying the various layers of a third embodiment of the pickle ball paddle.
FIG. 9 is a laminate stack identifying the various layers of a fourth embodiment of the pickle ball paddle.

FIG. 7 illustrates a laminate stack of second alternative flat panel portion 40. This stack is similar to that show in FIG. 3 but has a different eleven layer laminate with a core layer 42 and a different damping layer 44. Core layer 42 is made of a structural balsa material preferably Baltek® SB made by Baltek Inc. The damping layer is a thin rubber damping layer 44 such as Hytone™ LS-017 made by Hygenic Corporation is on each side of the core layer.

Laminates can also be made with American Acoustical PDP sound damping material instead of the rubber.

FIG. 8 illustrates a laminate stack of third alternative flat paddle portion 50. This stack is similar to that show in FIG. 7 but has a different core lay 52. Core layer 52 in this embodiment can be a polypropylene honeycomb structure called PP Plascore Honycomb made by Plasticore Inc. or a structure called Nidapalst 8 made by Nidaplast composites France. The damping layer is a thin rubber damping layer 44 such as Hytone™ LS-017 made by Hygenic Corporation is attached on each side of the core layer 52 using a bonding adhesive 20.

FIG. 9 illustrates a laminate stack of fourth alternative flat paddle portion 60. This stack is similar to that show in FIG. 7 but has 13 layers with a special coated peel ply layer 62 on the front and back paddle surfaces. An example of suitable peel ply layer is available from Precision Fabrics Group of Greensborough North Carolina style 66214 the data sheet of which, downloaded Jun. 20, 2023, is incorporated herein. A damping layer 64 is applied to the front and back sides of the balsa core 42 using layers of bonding adhesive 20. This layer is referred to by players of the game as a raw carbon or fiberglass finish. The roughness which occurs from cured epoxy resin imparts grip on the surface which creates spin.

Figures 10, 11, 12:
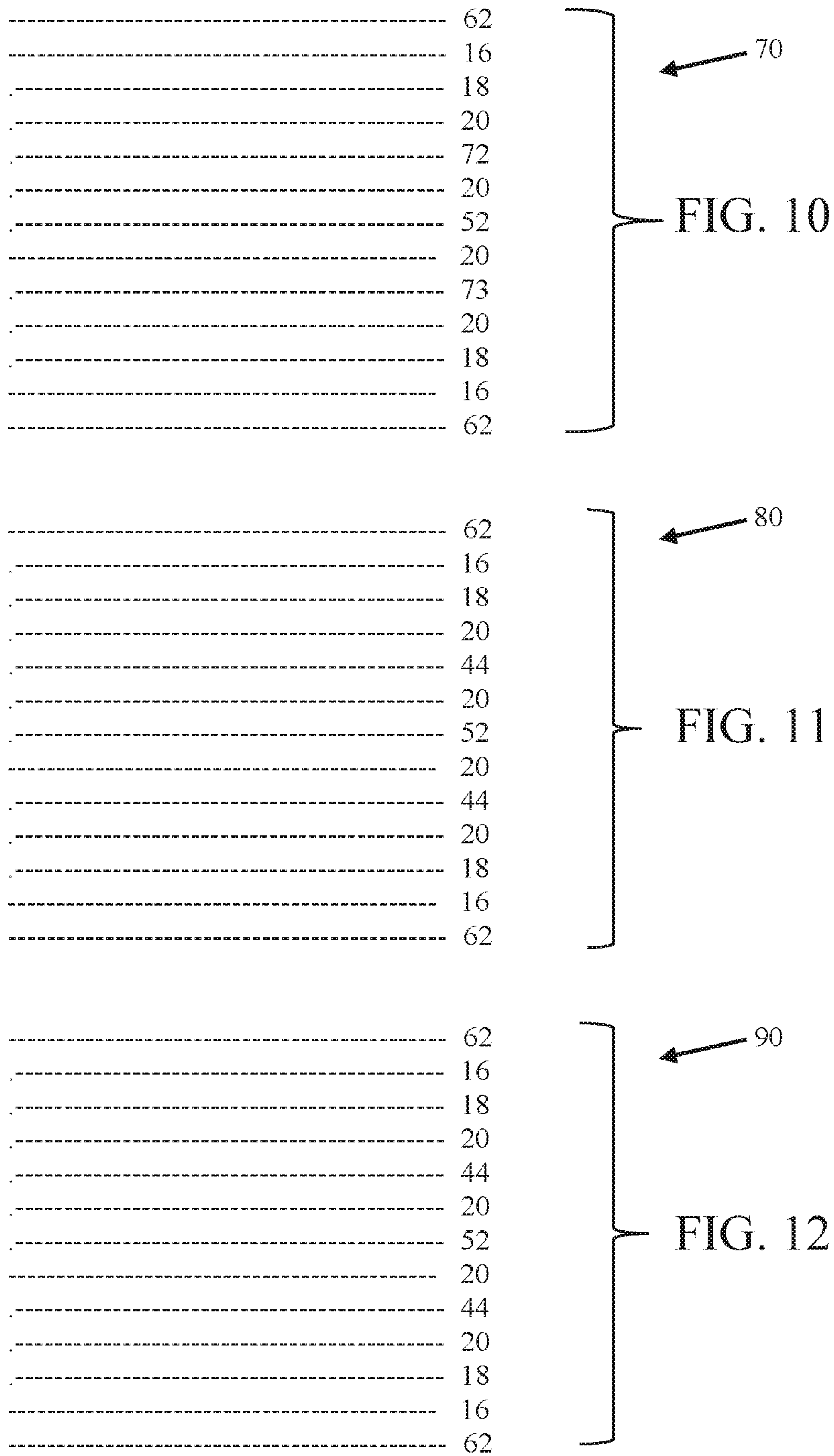
FIG. 10 is a laminate stack identifying the various layers of a fifth embodiment of the pickle ball paddle.
FIG. 11 is a laminate stack identifying the various layers of a sixth embodiment of the pickle ball paddle.
FIG. 12 is a laminate stack identifying the various layers of a seventh embodiment of the pickle ball paddle.

FIG. 10 illustrates a laminate stack of fifth alternative flat paddle portion 70. This carbon paddle stack has special coated peel ply layer 62 on the front and back paddle surfaces similar to that show in FIG. 9. This embodiment has rubber damping sheeting layer 72 is attached on front and back sides of a polypropylene honeycomb core 52 is attached on each side of the core layer 52 using a bonding adhesive 20. Suitable rubber damping sheeting layers are available from MFG Performance Health or Hygienic Corporation.

FIG. 11 illustrates a laminate stack of sixth alternative flat paddle portion 80. This paddle stack is made of fiberglass construction rather than carbon fiber but is otherwise similar to FIG. 9. Fiberglass layers 74 and 76 having a prreimpregnated resin binder are separated from the balsa core 42 by a layer by an acoustical sound deadening material 78 such as CLD-007 from American Acoustical Products. The layers are connected using layers of bonding adhesive 20.

FIG. 12 illustrates a laminate stack of seventh alternative flat paddle portion 90 This paddle stack is made of fiberglass/carbon fiber hybrid construction rather than only fiberglass but is otherwise similar to the FIG. 11 with Balsa core and an acoustical sound deadening layer 78. The adjacent first and second woven fabric layers comprise a first layer of preimpregnated unidirectional woven carbon fiber and a second layer of preimpregnated fiberglass forming a hybrid construction.

Figures 13, 14, 15:
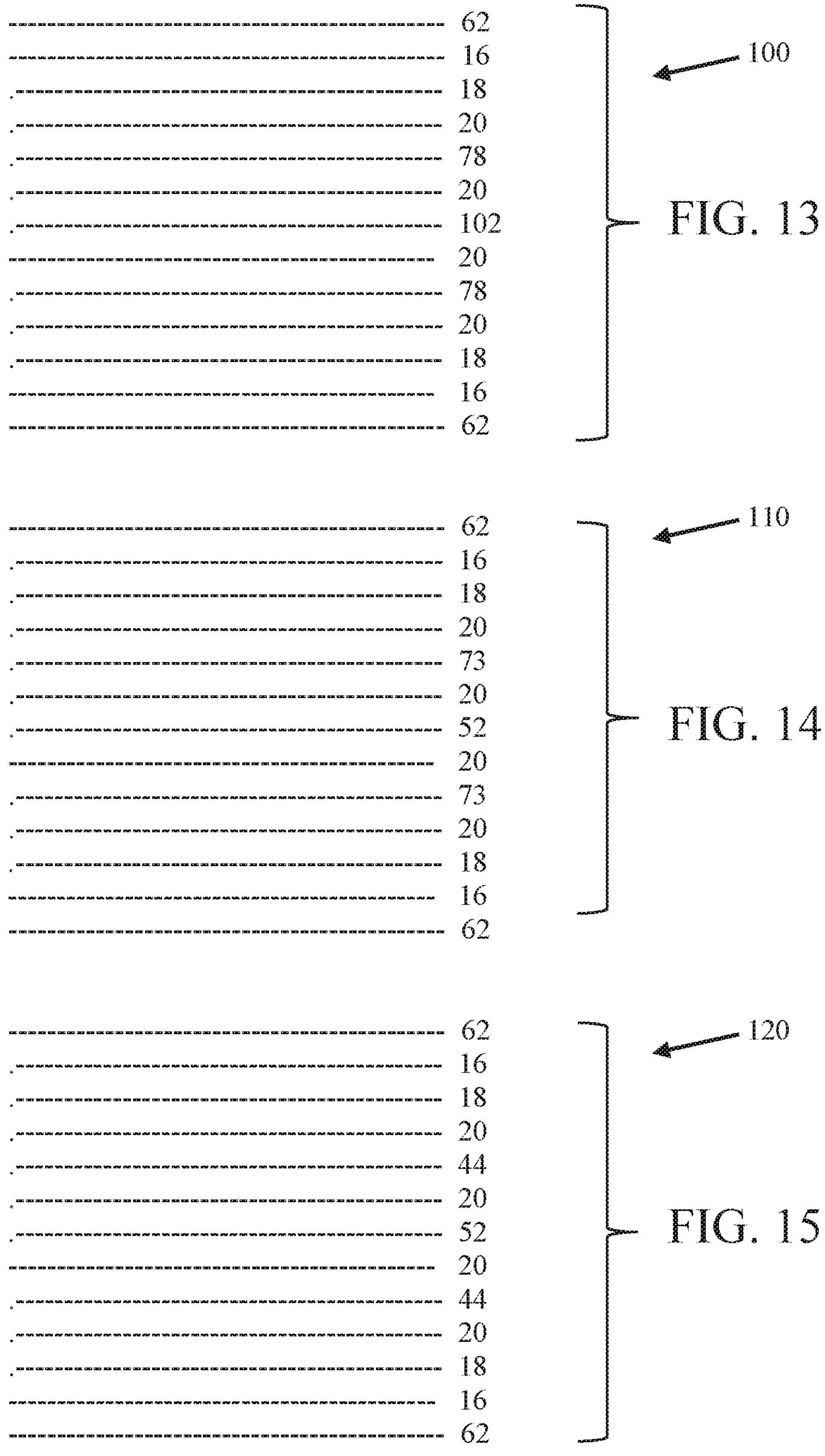
FIG. 13 is a laminate stack identifying the various layers of an eighth embodiment of the pickle ball paddle.
FIG. 14 is a laminate stack identifying the various layers of a ninth embodiment of the pickle ball paddle.
FIG. 15 is a laminate stack identifying the various layers of a tenth embodiment of the pickle ball paddle.

FIG. 13 illustrates a laminate stack of eighth alternative flat paddle portion 100. This paddle stack is made of carbon paddle laminate construction with cork core 102 and an acoustical sound deadening layer 78 but is otherwise similar to FIG. 9. The layers are connected using layers of bonding adhesive 20.

FIG. 14 illustrates a laminate stack of ninth alternative flat paddle portion 110. This paddle stack is made of a fiberglass/carbon hybrid construction like FIG. 12 with rubber damping layer 73 and polypropylene honeycomb core 52. An example of suitable rubber damping layer called HYTONE LS-034 is made by Hygienic Corporation of Akron Ohio. The LS034 data sheet, downloaded Jun. 20, 2023, is incorporated by reference herein. The layers are in the laminate stack are connected using layers of bonding adhesive 20.

FIG. 15 illustrates a laminate stack of tenth alternative flat paddle portion 120. This paddle stack is made of a two fiberglass layer 122 and 124 woven fabric paddle construction. There are two rubber damping sheeting layers 78 on the front and back sides of the polypropylene honeycomb core 52. The layers are connected using a bonding adhesive 20 as illustrated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A laminated pickle ball paddle comprising:

a flat blade portion; and a handle sized to be used with a single hand;

wherein the flat blade portion is a multi-layer laminate having:

a first layer of a carbon unidirectional which is preimpregnated with a polymer resin;

a second layer of a carbon fiber unidirectional which is preimpregnated with a polymer resin oriented about 90° to that of the adjacent layer;

an adhesive layer which is connected to a sound deadening layer of cork and or rubber composite and or sound damping paper;

another adhesive layer;

a central core layer of a polypropylene honeycomb structure;

an adhesive layer with a connected sound deadening layer of cork and or rubber composite;

another second layer of a carbon fiber unidirectional which is preimpregnated with a polymer resin; and another first layer of a carbon fiber unidirectional which is preimpregnated with a polymer resin with the fiber of the second layer oriented about 90° to that of adjacent layer.

2. A laminated pickle ball paddle comprising:

a flat portion; and a handle sized to be used with a single hand;

wherein the flat portion is a multi-layer laminate having:

a first layer of a carbon fiber unidirectional which is preimpregnated with a polymer resin;

a second layer of a carbon fiber unidirectional is preimpregnated with a polymer resin with the fiber of the second layer oriented about 90° to that of the adjacent layer;

an adhesive layer;

a sound deadening layer of rubber;

an adhesive layer;

a central core layer made of a structural balsa material;

an adhesive layer;

a sound deadening layer of rubber;

an adhesive layer;

another second layer of a carbon fiber unidirectional which is preimpregnated with a polymer resin; and another first layer of a carbon fiber unidirectional which is preimpregnated with a polymer resin with the fibers of the second layer oriented about 90° to that of adjacent layer.

3. A laminated pickle ball paddle comprising:

a flat blade portion; and a handle sized to be used with a single hand;

wherein the flat blade portion is a multi-layer laminate having:

a first layer of a carbon fiber unidirectional which is preimpregnated with a polymer resin;

a second layer of a carbon fiber unidirectional which is preimpregnated with a polymer resin with the fiber of the second layer oriented about 90° to that of the adjacent layer;

an adhesive layer;

a sound deadening layer of rubber;

an adhesive layer;

a central core layer made of a polypropylene honeycomb structure;

an adhesive layer;

a sound deadening layer of rubber;

an adhesive layer;

another second layer of a carbon fiber unidirectional which is preimpregnated with a polymer resin; and another first layer of a carbon fiber unidirectional which is preimpregnated with a polymer resin with the fiber of the second layer oriented about 90° to that of adjacent layer.

4. A method of forming laminated pickle ball paddle blade:

forming a multi-layer laminate stack having:

a first layer of a carbon fiber unidirectional which is preimpregnated with a polymer resin;

a second layer of a carbon fiber unidirectional which is preimpregnated with a polymer resin with the fiber of the second layer oriented about 90° to that of the adjacent layer;

an adhesive layer;

a sound deadening layer of rubber;

an adhesive layer;

a central core layer made of a structural balsa material;

an adhesive layer;

a sound deadening layer of rubber;

an adhesive layer;

another second layer of a carbon fiber unidirectional which is preimpregnated with a polymer resin; and another first layer of a carbon fiber unidirectional which is preimpregnated with a polymer resin with the fiber of the second layer oriented about 90° to that of adjacent layer;

placing the laminate stack between platens of a hot press;

closing the platens about the laminate stack and maintaining a compressive force of 5 to 100 PSI is applied;

holding platen temperature at about 250 degrees fahrenheit for about 2 hours to cause the preimpregnated resin in the carbon fiber layers to cure; and upon at least partial cooling the laminate stack to room temperature the cured laminate composite is removed from the press.

5. A laminated pickle ball paddle comprising:

a flat blade portion; and a handle sized to be used with a single hand;

wherein the flat blade portion is a multi-layer laminate having:

an outer coated peel ply layer;

a first layer of a woven fiber layer preimpregnated with a polymer resin;

a second layer of a woven fiber layer preimpregnated with a polymer resin;

an adhesive layer;

a sound deadening layer;

an adhesive layer;

a central core layer;

an adhesive layer;

a sound deadening layer;

an adhesive layer;

another a second layer of a woven fiber layer preimpregnated with a polymer resin;

another first layer of a woven fiber layer preimpregnated with a polymer resin; and another outer coated peel ply layer.

6. The laminated pickle ball paddle of claim 5 wherein the adjacent first and second woven fabric layers comprises first and second unidirectional woven carbon fiber layers oriented 90° to one another.

7. The laminated pickle ball paddle of claim 6 wherein the central core layer comprises an end grain balsa wood layer.

8. The laminated pickle ball paddle of claim 6 wherein the central core layer comprises polypropylene honeycomb layer.

9. The laminated pickle ball paddle of claim 6 wherein the central core layer comprises a layer of cork.

10. The laminated pickle ball paddle of claim 5 wherein the adjacent first and second woven fabric layers comprises a preimpregnated fiberglass fiber layers.

11. The laminated pickle ball paddle of claim 10 wherein the central core layer comprises an end grain balsa wood layer.

12. The laminated pickle ball paddle of claim 10 wherein the central core layer comprises polypropylene honeycomb layer.

13. The laminated pickle ball paddle of claim 5 wherein the adjacent first and second woven fabric layers comprise a first layer of preimpregnated unidirectional woven carbon fiber and a second layer of preimpregnated fiberglass.

14. The laminated pickle ball paddle of claim 13 wherein the central core layer comprises an end grain balsa wood layer.

15. The laminated pickle ball paddle of claim 13 wherein the central core layer comprises polypropylene honeycomb layer.

16. A method of forming laminated pickle ball paddle blade:

forming a multi-layer laminate stack having:

orienting a first layer of a carbon fiber unidirectional which is preimpregnated with a polymer resin atop a second layer of a carbon fiber unidirectional which is preimpregnated with a polymer resin with the fiber of the second layer oriented about 90° to that of the adjacent layer;

placing the stacked first and second carbon fiber layers between platens of a hot press; and closing the platens about the carbon fiber layers and maintaining a compressive force of 5 to 100 PSI is applied and holding the platen temperature at about 250 degrees fahrenheit for about 2 hours to cause the preimpregnated resin in the carbon fiber layers to cure into a carbon sheet;

forming a laminate stack comprising;

a first outer coated peel ply layer;

a first carbon sheet;

an adhesive layer;

a sound deadening layer of rubber;

an adhesive layer;

a central core layer made of a structural balsa material;

an adhesive layer;

a sound deadening layer of rubber;

an adhesive layer;

another second layer of a carbon fiber unidirectional which is preimpregnated with a polymer resin; and a second outer coated peel ply layer placing the laminate stack between the platens of a hot press;

closing the platens about the laminate stack and maintaining a compressive force of 5 to 100 PSI is applied;

holding the platen temperature at about 250 degrees fahrenheit to cure the adhesive, and upon at least partial cooling the laminate stack to room temperature removing the laminate stack from the press.

* * * * *